3,334,132
SYNTHESIS OF ACRYLIC ACID ESTERS
Phillip S. Landis, Woodbury, N.J., assignor to Mobil Oil Corporation, a corporation of New York
No Drawing. Filed Mar. 27, 1964, Ser. No. 355,427
5 Claims. (Cl. 260—486)

This invention relates to the synthesis of acrylic acid esters by the carbonylation of acetylene in the presence of alcohols, and more particularly to a method of producing acrylic acid esters in the presence of novel catalyst compositions.

A considerable number of materials have been heretofore proposed as catalysts for the synthesis of acrylic acid esters by the interaction of acetylene, alcohol and carbon monoxide according to the equation:

$$CH\equiv CH + ROH + CO \rightarrow CH_2=CH-COOR$$

Typical catalysts include nickel salts such as the nickel halides, nickel sulfides, nickel thiocyanates, etc., nickel complexes which contain phosphonium, arsonium or stilbonium compounds, e.g. triphenylphosphine—nickel chloride; and nickel halides in the form of complex compounds with tertiary amines or ammonium compounds derived therefrom. While other metals of the iron group such as cobalt and iron show carbonylation activity and have been suggested for use, the preferred catalysts have been nickel halides and complexes thereof with complex-forming organic compounds. In general the carbonylation reaction is carried out at temperatures ranging between 100° C. and 250° C. at pressures of 5 to 100 atmospheres.

In accordance with the present invention it has been discovered that crystalline aluminosilicates which contain a transition metal cation can be effectively employed as catalysts for the synthesis of acrylic acid esters. Such catalysts compositions are essentially stable, can be used in small concentrations, generally introduce no troublesome preparation problems, and permit the interaction of acetylene, alcohol and carbon monoxide to be carried out under practicable and controllable rates.

The term "transition metal" as employed herein is defined by Webster's New International Dictionary, 1961 Edition, and refers to any of the series of metals, such as scandium, titanium, vanadium, chronium, manganese, cobalt, iron and nickel, which fall in the center of the long form of the periodic table and have valence electrons in two shells instead of only one. The transition metals are further characterized in most cases by variable oxidation states and magnetic properties.

The catalyst compositions contemplated herein are prepared by contacting a suitable precursor aluminosilicate with an aqueous solution containing a source of transition metal cations under appropriate temperature conditions for a period of time sufficient to bring about the extent of desired base exchange of such ion or mixtures thereof. It is contemplated that any ionizable compound of a transition metal capable of replacing the metallic ions originally associated with the precursor aluminosilicate, e.g., alkali metals, may be employed for base exchange. Suitable materials include soluble compounds of scandium, titanium, vanadium, chromium, manganese, iron, cobalt and nickel, as well as solutions containing mixtures of these ions and mixtures of the same with hydrogen ions or ions capable of conversion to hydrogen ions, e.g., ammonium ions. Base exchange with such ions may be accomplished sequentially or concurrently with exchange of the transition metal cation.

The pH value of the base exchange solution will vary depending upon the precursor aluminosilicate and its atomic array of silicon and aluminum. Where the aluminosilicate precursor material has an atomic ratio of silicon to aluminum greater than about 2.7, the base exchange solution may contain a hydrogen ion, transition metal cation, ammonium ion, or a mixture thereof, equivalent to a pH value ranging from less than 1.0 up to a pH value of about 12.0. Within this range, pH values for solutions containing a metallic cation and/or an ammonium ion range from 4.0 to 10.0 and are preferably between a pH value of 4.5 to 8.5. For solutions containing a hydrogen ion alone or with a transition metal cation the pH values range from less than 1.0 up to about 7.0, and are preferably within the range of less than 1.0 up to 4.5. Where the atomic ratio is greater than about 1.1 and less than about 2.7, the pH value for an exchange solution containing a hydrogen ion or a transition metal cation ranges from 3.8 to 8.5. Where ammonium ions are employed, either alone or in combination with the metallic cations, the pH value ranges from 4.5 to 8.5. When the aluminosilicate material has an atomic ratio of silicon to aluminum less than about 1.5, ammonium ions, if used, are preferred to hydrogen ions.

Effective treatment with the base exchange solution to obtain the corresponding transition metal analog will vary with the duration of the treatment and temperature at which it is carried out. Such treatments also are governed by equilibrium considerations. Elevated temperatures tend to hasten the speed of treatment whereas the duration thereof varies inversely with the metal ion concentration of the base exchange solution. In general, the temperatures employed range from below ambient room temperatures of 24° C. up to temperatures below the decomposition temperatures of the aluminosilicate. Following the base exchange treatment, the resulting aluminosilicate is washed with water, preferably distilled water, until the effluent wash water has a pH value of between about 4.0 and 8.0. The aluminosilicate is thereafter dried to remove the liquid water phase, and preferably activated by heating at temperatures ranging from about 400° F. to 1500° F.

The extent to which base exchange takes place can be controlled so that the metallic ions originally associated with the precursor material are either totally replaced or partially replaced with the desired ions in a proportion of less than 5 percent up to 100 percent. In most instances it is preferred that base exchange be carried out for a period of time sufficient to reduce the alkali metal content of the precursor aluminosilicate to less than about 0.25 equivalent per gram atom of aluminum. In such instances where hydrogen or ammonium ions are employed, it is preferred that the transition metal cation be present in an amount ranging from 40 percent to 85 percent of the total equivalents of ions of positive valence.

The actual procedure employed for carrying out the fluid treatment of the aluminosilicate may be accomplished in a batchwise or continuous method under atmospheric, subatmospheric, or superatmospheric pressure. A solution of the desired transition metal ion, in the form of a molten material, vapor, aqueous or non-aqueous solution, may be passed slowly through a fixed bed of the aluminosilicate precursor material. If desired, hydrothermal treatment or a corresponding non-aqueous treatment, with polar solvents may be effected by introducing the aluminosilicate and solution of ionizable metal compound into a closed vessel maintained under autogenous pressure.

Exemplary metal compounds which can be employed as a source of transition metal cations include inorganic salts such as ferric chloride, nickel nitrate, chromium nitrate, vanadium sulfate, manganese chloride, zirconium nitrate, cobalt nitrate as well as organic salts of the foregoing metals such as chromic acetate, nickel formate, and the like. The preferred salts are the chlorides, nitrates, acetates and sulfates.

A wide variety of compounds may be employed as a source of hydrogen ions or hydrogen ion precursors. Typical compounds include inorganic and organic acids such as hydrochloric acid, nitric acid, carbonic acid, formic acid, etc., as well as ammonium compounds or substituted ammonium compounds, amines, amine complexes and phosphorous analogs thereof which can be decomposed or oxidized to provide hydrogen ions when an aluminosilicate treated with a solution of the same is subjected to temperatures below the decomposition temperatures of the aluminosilicate. Typical ammonium compounds include ammonium hydroxide, ammonium chloride and tetraalkyl and tetraaryl ammonium salts such as tetramethylammonium hydroxide, trimethylammonium hydroxide, and the like.

The catalyst compositions can be derived from a wide variety of natural and synthetic aluminosilicates which possess three dimensional network of $SiO_4$ and $AlO_4$ tetrahedra in which the tetrahedra are cross-linked by the sharing of oxygen atoms such that the ratio of total aluminum and silicon atoms to oxygen atoms is 1:2. Such compositions are further characterized by the presence in their molecular structure of at least 0.5 equivalent per gram atom of aluminum, usually 0.9±0.1 equivalents, of an ion of positive valence and an ability to undergo dehydration and rehydration without substantially affecting the spatial arrangement of inorganic oxides within their dimensional framework. The aluminosilicate precursors may be represented in their hydrated form by the formula:

$$M_{2/n}O:Al_2O_3:wSiO_2:yH_2O$$

wherein M is a cation having a valence of $n$, $w$ is a number representing the average moles of silica, and $y$ the moles of water per mole of $Al_2O_3$. The cation is usually an alkali or alkaline earth metal depending upon whether the aluminosilicate is synthesized or occurs naturally. The mole ratio of silica to alumina ($w$) may vary from about 2.0 to 40.

Typical precursor materials may be chosen from the known sythesized crystalline aluminosilicates which have been designated as zeolites X, A, Y, L, D, R, S, T, Z, E, F, Q, and B.

Other synthesized crystalline aluminosilicates include those designated as ZK-4 and ZK-5.

ZK-4 can be represented in terms of mole ratios of oxides as:

0.1 to $0.3R:0.7$ to $1.0M_{2/n}O:Al_2O_3:2.5$ to $4.0SiO_2:yH_2O$ wherein R is a member selected from the group consisting of methylammonium oxide, hydrogen oxide and mixtures thereof with one another, M is a metal cation having a valence of $n$, and $y$ is any value from about 3.5 to 5.5.

ZK-5 can be represented in terms of mole ratios of oxides as:

0.3 to $0.7R_{2/m}O:0.3$ to $0.7M_{2/n}O:Al_2O_3:4.0$ to $6.0SiO_2:yH_2O$ wherein R is selected from the group consisting of a nitrogen-containing cation derived from N,N'-dimethyltriethylene diammonium ion and mixtures of said cation with hydrogen, and $m$ is the valence thereof; M is a metal and $n$ the valence thereof, and $y$ is any value from 6 to about 10.

Among the naturally occurring crystalline aluminosilicates which can be employed for purposes of the invention are included faujasite, heulandite, clinoptilolite, chabazite, gmelinite, mordenite, dachiardite, and erionite.

Other aluminosilicates which can be used as precursor materials are caustic treated clays.

It is to be understood that, although reference has been made to aluminosilicates as precursor materials, it is intended to include other materials which have an analogous structure to aluminosilicates resulting from isomorphous substitution of some or all of the atoms of aluminum or silicon with other elements, e.g., substitution of germanium for silicon and/or gallium for aluminum.

Preferred crystalline aluminosilicates for use in accordance with the invention have ratios of silicon to aluminum of about 1.5 or greater, and preferably greater than about 2.0. Preferred materials are thus derived from precursor aluminosilicates such as mordenite and zeolites X, Y, T and ZK-5. These and other useful aluminosilicates are further characterized by their sorption capacity of at least about 4 weight percent normal butane at 760 mm. at 25° C.

The starting alcohols used for synthesis of acrylic acid esters are preferably the aliphatic monohydroxy saturated alcohols and ether alcohols containing up to about 22 carbon atoms, and preferably from one to twelve carbon atoms. Representative alcohols include, among others, methanol, ethanol, isopropanol, the butanols, octanols, higher fatty alcohols having straight and branched chain configuration, ethylene glycol monomethyl ether, ethylene glycol monoethyl ether, ethylene glycol monobutyl ether, and the like. Further included are polyhydric alcohols such as glycerol, pentaerythritol, sucrose, trimethylol propane and the alkylene oxide adducts thereof such as the ethylene oxide or propylene oxide adducts of glycerol or pentaerythritol, etc. Other starting materials include non-olefinic alcohols of the araliphatic and cycloaliphatic series such as cyclohexanol, methyl cyclohexanol, benzyl alcohol, phenylethyl alcohol, phenol, the cresols, xylenols and higher alkylated phenol such as isobutyl and isooctyl phenol.

The synthesis reaction is successfully carried out with the catalyst composition at temperatures between 100° C. and 250° C., preferably between 150° C. and 200° C. under a pressure within the range of 5 to 100 atmospheres, usually about 20 to 30 atmospheres. Generally the amount of catalyst employed will range from about 0.1 to 10% by weight, usually about 0.3 to 5% based on the total weight of the non-gaseous reaction mixture.

The reaction may be initiated by introducing the catalyst and alcohol into a suitable pressure vessel followed by introduction of acetylene and carbon monoxide separately or as a mixture of gases. The carbon monoxide may contain an inert gas such as nitrogen, hydrogen or carbon dioxide, and instead of acetylene, there may be employed a gas which contains acetylene. Inert solvents such as acetone, dimethyl formamide, tetrahydrofurane, N-methylpyrrolidone, and butyrolactone may also be added to the reaction mixture so as to provide an increased concentration of acetylene and carbon monoxide.

The carbon monoxide and acetylene are generally used in equal volumetric proportions although either may be used in excess of the other up to about 100 molar percent or more. The use of an acetylene excess of 5 to 50 molar percent is desirable since it enhances the rate of reaction substantially without producing undesired by-products.

The reaction may be carried out in a batchwise or continuous manner and the recovery of acrylic ester accomplished by either extraction or distillation. Polymerization inhibitors likewise may be employed to prevent undesirable side reactions during reaction or recovery.

The following examples illustrate the best mode now contemplated for carrying out the invention.

*Example 1*

A stainless steel autoclave is charged with 370 g. of ethanol and 5 g. of a calcined crystalline manganese faujasite prepared by treating sodium faujasite 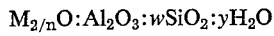=3.0) at 180° F. with a 1% by weight aqueous solution of $MnCl_2 \cdot 4H_2O$ for a period of time sufficient to reduce the sodium content below about 3% by weight. The autoclave is purged with nitrogen and equal parts of weight of acetylene and carbon monoxide are thereafer charged. The pressure is increased to about 40 p.s.i.g. by the further addition of the carbon monoxide— acetylene mixture and the autoclave heated to 100° C. The total pressure is then increased to about 300 p.s.i.g. with the carbon monoxide—acetylene gas mixture and the temperature raised to 150° C. The pressure is raised to about 450 p.s.i.g. by the periodic addition of the gas mixture and held at this level for about six hours. The reaction is terminated by cooling the autoclave and releasing the pressure. After filtering the reaction mixture the filtrate is distilled to recover an ethyl acrylate—ethanol azeotrope from higher boiling acrylate esters and polymer residue. The ethyl acrylate is recovered in good yield.

*Example 2*

In a manner similar to that described in Example 1, 1800 g. of 2-ethylhexanol is contacted with acetylene and carbon monoxide at 180° C. under a pressure of 60 p.s.i.g. in the presence of a crystalline acid-cobalt faujasite prepared by treating ammonium faujasite $$(SiO_2/Al_2O_3 = 6)$$

for 16 hours with a 1% by weight aqueous solution of $Co(NO_3)_2 \cdot 6H_2O$ which was thereafter washed and calcined. After completion of the synthesis reaction 2-ethylhexyl acrylate is recovered by distillaiton in good yield.

*Example 3*

The reaction described in Example 1 is likewise effectively carried out in the presence of a crystalline iron faujasite.

*Example 4*

The reaction described in Example 2 may likewise be carried out utilizing a crystalline nickel faujasite.

What is claimed is:
1. In the synthesis of acrylic acid esters by interaction of acetylene, alcohol and carbon monoxide; the improvement which comprises carrying out the reaction in the presence of a crystalline aluminosilicate catalyst containing at least 0.5 equivalent pre gram atom of aluminum of ions of positive valence, the cations of which comprise a transition metal.
2. The method of claim 1 wherein the aluminosilicate is faujasite.
3. The method of claim 1 wherein the aluminosilicate contains less than about 10% by weight of sodium.
4. The method of claim 1 wherein the aluminosilicate has a silicon to aluminum ratio of at least about 1.5.
5. The method of claim 1 wherein the aluminosilicate has a silicon to aluminum ratio of greater than about 2.0.

References Cited

UNITED STATES PATENTS

| | | | |
|---|---|---|---|
| 1,694,122 | 12/1928 | Jaeger | 260—524 |
| 3,060,227 | 10/1962 | Stadler et al. | 260—486 |
| 3,100,795 | 8/1963 | Franz et al. | 260—486 |
| 3,106,577 | 10/1963 | Ciocchetti | 260—533 |
| 3,161,672 | 12/1964 | Zachry et al. | 260—486 |

LORRAINE A. WEINBERGER, *Primary Examiner.*

ALBERT HALLUIN, *Assistant Examiner.*